(12) United States Patent
Clarke et al.

(10) Patent No.: US 9,648,402 B2
(45) Date of Patent: May 9, 2017

(54) IN-BAND COMMUNICATION CHANNEL IN OPTICAL NETWORKS

(71) Applicants: Steven Clarke, Ottawa (CA); Sebastien Gareau, Ottawa (CA)

(72) Inventors: Steven Clarke, Ottawa (CA); Sebastien Gareau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 76 days.

(21) Appl. No.: 14/618,645

(22) Filed: Feb. 10, 2015

(65) Prior Publication Data

US 2016/0234580 A1   Aug. 11, 2016

(51) Int. Cl.
| | |
|---|---|
| *H04Q 11/00* | (2006.01) |
| *H04L 12/911* | (2013.01) |
| *H04J 13/16* | (2011.01) |
| *H04J 3/16* | (2006.01) |

(52) U.S. Cl.
CPC ........ *H04Q 11/0066* (2013.01); *H04J 3/1652* (2013.01); *H04L 47/828* (2013.01); *H04Q 2011/0086* (2013.01)

(58) Field of Classification Search
CPC ......... H04Q 11/0066; H04Q 2011/0086; H04J 3/1652; H04L 47/828
See application file for complete search history.

(56) References Cited

U.S. PATENT DOCUMENTS

| | | | |
|---|---|---|---|
| 6,724,996 B1 * | 4/2004 | Ballintine | H04J 3/1611 370/395.4 |
| 6,765,659 B1 | 7/2004 | Bhatnagar et al. | |
| 8,417,111 B2 | 4/2013 | Moynihan et al. | |
| 2005/0286521 A1 * | 12/2005 | Chiang | H04J 3/1652 370/389 |
| 2009/0116847 A1 | 5/2009 | Duan et al. | |
| 2009/0196602 A1 | 8/2009 | Saunders et al. | |
| 2010/0278536 A1 | 11/2010 | Mak et al. | |
| 2013/0129350 A1 | 5/2013 | Koley et al. | |
| 2013/0209091 A1 | 8/2013 | Mateosky et al. | |
| 2013/0308943 A1 | 11/2013 | Young et al. | |
| 2014/0093235 A1 | 4/2014 | Gareau et al. | |

(Continued)

FOREIGN PATENT DOCUMENTS

EP   2106051 A1   9/2009

OTHER PUBLICATIONS

ITU standards for OTN G.709, https://www.itu.int/rec/T-REC-G.709-201202-I/en, Dec. 2012.*

(Continued)

*Primary Examiner* — Leslie Pascal
(74) *Attorney, Agent, or Firm* — Clements Bernard Walker PLLC; Christopher L. Bernard; Lawrence A. Baratta, Jr.

(57) ABSTRACT

Systems and methods, for an in-band communication channel in an optical network, include adapting one or more client signals into a line signal for transmission to the second node, and utilizing line adaptation bandwidth of the line signal for the in-band communication channel. The in-band communication channel is operationally independent from the one or more client signals while concurrently being transported together over the line signal. The line adaptation allows a rate of the line signal to be independent of rates of the one or more client signals.

20 Claims, 5 Drawing Sheets

(56) References Cited

U.S. PATENT DOCUMENTS

2014/0241727 A1    8/2014  Lim et al.
2015/0078406 A1*   3/2015  Caggioni .............. H04J 3/1664
                                                              370/537

OTHER PUBLICATIONS

Roberts et al., "100G and Beyond with Digital Coherent Signal Processing," IEEE Communications Magazine, Jul. 2010, pp. 62-69.
Gho et al., "Rate-Adaptive Coding for Optical Fiber Transmission Systems," Journal of Lightwave Technology, vol. 29, No. 2, Jan. 15, 2011, pp. 222-223.
"Proposed model for the OTUCn and OCh layer for OTN beyond 100G," ZTE Corporation, China Telecommunications Corporation, China Unicorn Network Communications Group Company Limited, International Telecommunication Union, Jul. 2013, pp. 1-6.
Roberts et al., "Flexible Transceivers," ECOC Technical Digest, pp. 1-3.
OIF Optical Internetworking Forum; OIF Carrier WG Requirements on Transport Networks in SDN Architectures Transport SDN, Sep. 18, 2013, pp. 1-25.
May 26, 2016, European Search Report issued in European Patent Application EP 16 15 2047.

* cited by examiner

IN-BAND COMMUNICATION CHANNEL IN OPTICAL NETWORKS

FIELD OF THE DISCLOSURE

The present disclosure relates generally to optical communication systems and methods. More particularly, the present disclosure relates to a in-band communication channel in optical networks that may be used for Software Defined Networking (SDN) applications or the like.

BACKGROUND OF THE DISCLOSURE

Conventionally, optical networks rely on in-band communication channels for a variety of Operations, Administration, Maintenance, and Provisioning (OAM & P) functions as well as for control plane signaling and the like. Exemplary in-band communication channels include the Data Communication Channel (DCC) in Synchronous Optical Network (SONET) and Synchronous Digital Hierarchy (SDH) and the General Communication Channel (GCC) in Optical Transport Network (OTN). In contrast to SONET/SDH where the DCC has a constant data rate on the order of 1 Mb/s, the GCC data rate depends on the OTN line rate, i.e., Optical channel Data Unit (ODU) data rate. For example, GCC data rate in the case of an Optical channel Data Unit-1 (ODU1) is ~333 kb/s, for Optical channel Data Unit-2 (ODU2), its data rate is ~1.3 Mb/s, for Optical channel Data Unit-4 (ODU4), its data rate is ~13 Mb/s, and the like. In the past with SONET/SDH, the in-band communication channels were first used solely for OAM & P data between nodes and network management. Here, the low data rate of SONET/SDH DCC sufficed. With OTN, the in-band communication channels evolved to also carry control plane signaling in addition to OAM & P data. Here, the higher GCC data rate in OTN allowed the addition of control plane signaling with the OAM & P data.

Additional applications are evolving, such as SDN, which will require additional bandwidth on the in-band communication channels. Specifically, SDN is a centralized control architecture which requires the gathering and backhaul of data from the nodes to a centralized location/server, i.e., "hubbed" traffic flow patterns. It is also expected that SDN will provide a rich suite of flexible applications, such as in combination with Network Functions Virtualization (NFV). The conventional GCC data rate in OTN will have difficulty in handling the hubbed nature of SDN and the evolving bandwidth requirements, in addition to control plane signaling, OAM & P data communication, etc.

Thus, there is a need for a higher rate in-band communication channel. Unattractive options include: 1) the OTN frame could be modified to allow for a higher rate OTN/GCC communication channel, but this is difficult due to standardization; 2) the line frame format (proprietary to each system vendor) could be designed to include a communications channel time slot meaning a higher required line rate, with the requisite required extra link margin; or 3) a dedicated SDN communication channel could be allocated in the client payload, but would consume valuable client/customer transport bandwidth, and such an approach has generally been commercially unacceptable at the transport layer.

Thus, there is a need for a high-capacity in-band communication channel in optical networks.

BRIEF SUMMARY OF THE DISCLOSURE

In an exemplary embodiment, a method, in a first node in an optical network, for providing an in-band communication channel to a second node in the optical network includes adapting one or more client signals into a line signal for transmission to the second node; and utilizing line adaptation bandwidth of the line signal for the in-band communication channel. The method can further include increasing or decreasing a rate of the line signal to trade off link margin for extra capacity in the in-band communication channel, wherein the increasing or decreasing does not affect a rate of the one or more client signals. The in-band communication channel can be operationally independent from the one or more client signals while concurrently being transported together over the line signal. The adapting can allow a rate of the line signal to be independent of rates of the one or more client signals. The method can further include utilizing the in-band communication channel to communicate data to a Software Defined Networking (SDN) controller or through Network Functions Virtualization (NFV) applications. The one or more client signals can be any of Optical channel Transport Unit k (k=0, 1, 2, 3, 4, flex) or OTUk/Cn where C=100×n (n=1, 2, 3, . . . ) and the line signal can be a proprietary Single Vendor Intra-Domain Interface (SV-IaDI) signal. The one or more client signals each can include in-band communication channels through Optical Transport Network (OTN) General Communication Channel (GCC) overhead that is operated concurrently with the in-band communication channel. The in-band communication channels from the one or more client signals can be used for control plane signaling. The in-band communication channel can be at least an order of magnitude greater in capacity than each of the in-band communication channels of the one or more client signals.

In another exemplary embodiment, an optical modem configured to provide a in-band communication channel includes circuitry configured to adapt one or more client signals into a line signal for transmission to another modem; and circuitry configured to utilize line adaptation bandwidth of the line signal for the in-band communication channel. The optical modem can be configured to one of increase a rate of the line signal to trade off link margin for extra capacity in the in-band communication channel or decrease the rate when the in-band communication channel requires less capacity, wherein the increased rate of the line signal does not affect a rate of the one or more client signals. The in-band communication channel can be operationally independent from the one or more client signals while concurrently being transported together over the line signal. The one or more client signals can be adapted to the line signal allowing a rate of the line signal to be independent of rates of the one or more client signals. The optical modem can be configured to utilize the in-band communication channel to communicate data to a Software Defined Networking (SDN) controller. The one or more client signals can be any of Optical channel Transport Unit k (k=0, 1, 2, 3, 4, flex) or OTUk/Cn where C=100×n (n=1, 2, 3, . . . ) and the line signal can be a proprietary Single Vendor Intra-Domain Interface (SV-IaDI) signal. The one or more client signals each can include in-band communication channels through Optical Transport Network (OTN) General Communication Channel (GCC) overhead that is operated concurrently with the in-band communication channel. The in-band communication channels from the one or more client signals can be used for control plane signaling. The in-band communication channel can be at least an order of magnitude greater in capacity than each of the in-band communication channels of the one or more client signals.

In a further exemplary embodiment, a node configured to provide an in-band communication channel in an optical network includes one or more optical modems each including circuitry configured to adapt one or more client signals into a line signal for transmission to another modem, and circuitry configured to utilize line adaptation bandwidth of the line signal for the in-band communication channel; and a controller communicatively coupled to the one or more optical modems, wherein the controller is configured to enable communications between the in-band communication channels. The controller can be configured to communicate with a Software Defined Networking (SDN) controller through the in-band communication channels.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
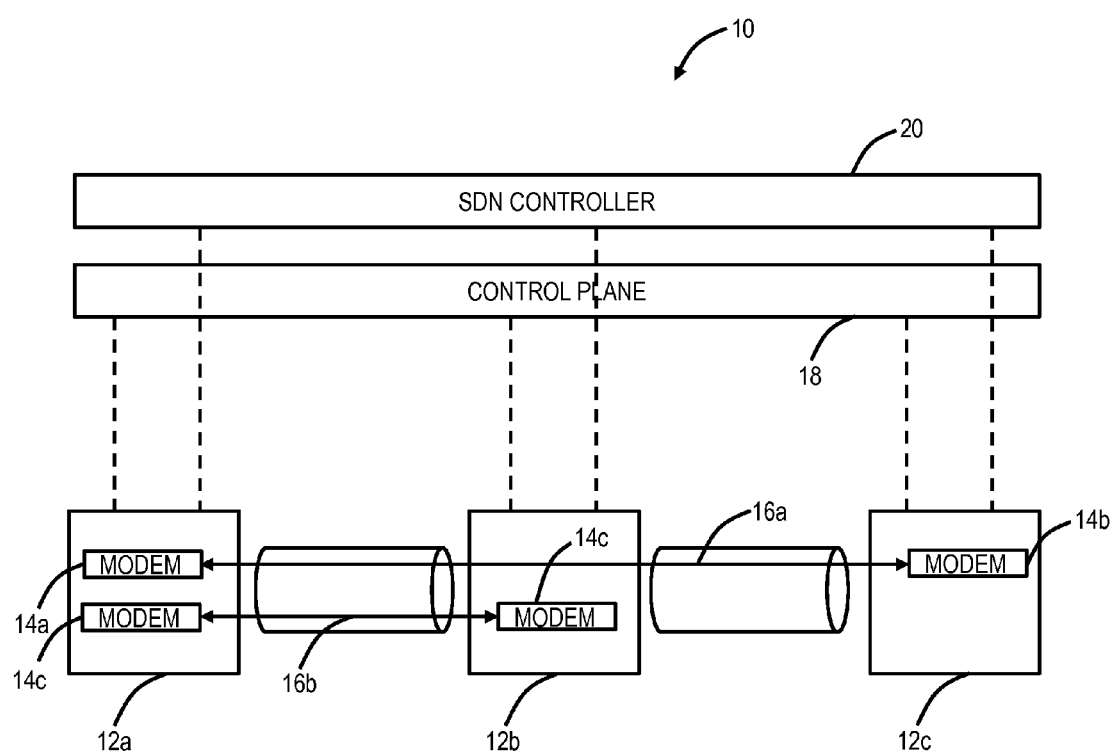
FIG. 1 is a network diagram of an exemplary network with three nodes for describing an in-band communication channel.

In various exemplary embodiments, an in-band communication channel, with higher capacity than existing in-band communication channels, is formed between two optical modems using line adaptation bandwidth. The line adaptation bandwidth is the difference between client bandwidth and line bandwidth. The client bandwidth can be rates based on Optical channel Transport Unit-k (OTUk) where k=2, 3, or 4; Optical channel Transport Unit Cn where C means 100 and n is a multiplier of 100, e.g. OTUC2 is ~200 Gb/s, OTUC4 is ~400 Gb/s, etc.; or the like. The line bandwidth can be based on a rate associated with a modem for a proprietary line side (Single Vendor Intra-Domain Interface (SV-IaDI)) and can vary based on baud-rate, modulation format, Soft-Decision Forward Error Correction (SD-FEC), and the like. The line rate adaptation bandwidth previously was idle or null data. Note, as described herein, the line adaptation bandwidth can be described as the difference between the actual client data rate (which is typically fixed at Layer 1 (Time Division Multiplexing (TDM) layer) and the physical operation rate of the associated optical modem carrying the client data (which can vary based on next-generation coherent modems which support flexible modulation and data rates as well as SD-FEC).

In various exemplary embodiments, this line adaptation bandwidth is configured to provide an in-band communication channel, in addition to providing a line rate adaptation function. Accordingly, the in-band communication channel is decoupled from the associated client signal, i.e., not carried in overhead of the associated client signal, but carried concurrently on a same optical signal as the associated client signal. Additionally, the in-band communication channel allows for a "re-sizable" data rate for the communications channel via re-sizing of the line rate, trading off link margin for extra rate/capacity if required, and is operationally independent from any line transport payload protocols (such as OTN, Ethernet, etc.). Operationally independent means the in-band communication channel described herein carries separate data from the client signals, is processed by different circuitry than the client signals, ultimately has a separate destination (for example, the communications channel is destined for the controller in a node whereas the client signals are destined for client ports, a switch, or the like, etc. Note, while operationally independent, the communication channel is transmitted together with the client signals in the line signal. In an exemplary embodiment, the in-band communication channel described herein can support data rates orders of magnitude higher than the current DCC or GCC data channels. Advantageously, the in-band communication channel described herein preserves the full payload capacity for customer/client traffic, is implemented independently from standards activities (i.e., no changes to the client signals), and no link margin is wasted.

Exemplary Network

Referring to FIG. 1, in an exemplary embodiment, a network diagram illustrates an exemplary network 10 with three nodes 12a, 12b, 12c. The nodes 12a, 12b, 12c are network elements that provide connectivity at one or more of Layers 0, 1, 2, and/or 3. For illustration purposes, the nodes 12a, 12b, 12c are shown with optical modems 14 forming connectivity, namely modems 14a, 14b connect the nodes 12a, 12c and modems 14c, 14d connect the nodes 12a, 12b. The network 10 is illustrated, for example, as an interconnected linear/mesh network, and those of ordinary skill in the art will recognize the network 100 can include other architectures, with additional nodes or with less nodes, with additional network elements and hardware, etc. The network 10 is presented herein as an exemplary embodiment of a network for describing the in-band communication channel.

The nodes 12a, 12b, 12c communicate with one another optically over links 16a, 16b formed by the modems 14. The network 10 can include a control plane 18 operating on and/or between the nodes 12a, 12b, 12c. The control plane 18 includes software, processes, algorithms, etc. that control configurable features of the network 10, such as automating discovery of the nodes 12a, 12b, 12c and other nodes; management of capacity of the links 16a, 16b; port availability on the nodes 12a, 12b, 12c; connectivity between ports; dissemination of topology and bandwidth information between the nodes 12a, 12b, 12c; calculation and creation of paths for connections; network level protection and restoration; and the like. Note, as described herein, the modems 14 can each be considered a port from a control plane perspective, i.e., a port is a logical point associated with a connection in the control plane 18 and the modem 14 is a physical hardware device forming the connection. In an exemplary embodiment, the control plane 18 can be Automatically Switched Optical Network (ASON), Generalized Multiprotocol Label Switching (GMPLS), Optical Signal and Routing Protocol (OSRP) (from Ciena Corporation), or the like. Of course, those of ordinary skill in the art will recognize the network 10 and the control plane 18 can utilize any type control plane for controlling the nodes 12a, 12b, 12c and establishing connections therebetween.

The network 10 can also include a Software Defined Networking (SDN) controller 20. SDN allows management of network services through centralization and abstraction of lower level functionality. This is done by decoupling the system that makes decisions about where traffic is sent (SDN control through the SDN controller 20) from the underlying systems that forward traffic to the selected destination (i.e., the physical equipment in the network 10). Work on SDN calls for the ability to centrally program provisioning of forwarding on the network 10 in order for more flexible and precise control over network resources to support new services. The SDN controller 20 is a processing device that has a global view of the network 10. Additionally, the SDN controller 20 can include or connect to SDN applications which can utilize the data from the SDN controller 20 for various purposes.

The control plane 18 operates on and between the nodes 12a, 12b, 12c based on control plane signaling. The control plane signaling required a communication channel between the nodes 12a, 12b, 12c as described herein, and this communication channel can be in-band or out-of-band. In an exemplary embodiment, the control plane signaling can use in-band signaling associated with OTN GCC overhead as described herein. Note, the control plane signaling is distributed in nature where communication is between adjacent nodes 12. Conversely, the SDN controller 20 communicates with each of the nodes 12a, 12b, 12c directly. This is a centralized communication structure compared to the distributed communication structure of the control plane 18. As described herein, it is likely not possible to add SDN communication between the nodes 12a, 12b, 12c and the SDN controller 20 on the existing in-band communication channel, i.e., OTN GCC, likely not possible with a ~13 Mb/s channel in the GCC overhead because this bandwidth is already being used by control plane traffic, and SDN may require greater bandwidth than OTN GCC provides.

Note, from a physical connectivity perspective, the SDN controller 20 can be connected to each of the nodes 12a, 12b, 12c directly or indirectly through other nodes. For example, the SDN controller 20 can physically connect to the node 12a which in turn connects to the nodes 12b, 12c. In sum, there has to be enough bandwidth on the communication channel for the SDN controller 20 to support centralized messaging as well as growth for future applications. Thus, the present disclosure proposes an in-band communication channel that is provided through the modems 14, independent of client traffic between the nodes 12, and with an ability to scale to meet future application growth.

Figure 2:
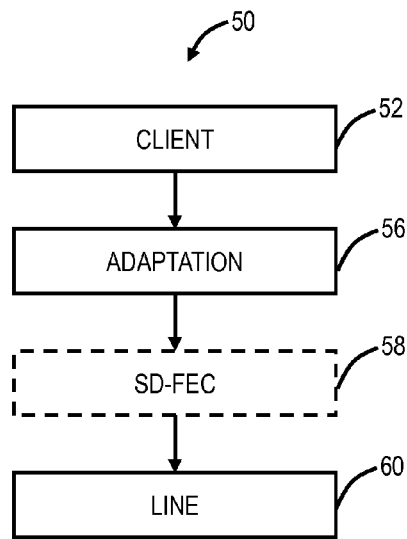
FIG. 2 is an atomic function diagram of a line adaptation process, which may be implemented in the modems in the network of FIG. 1.
Figure 3:
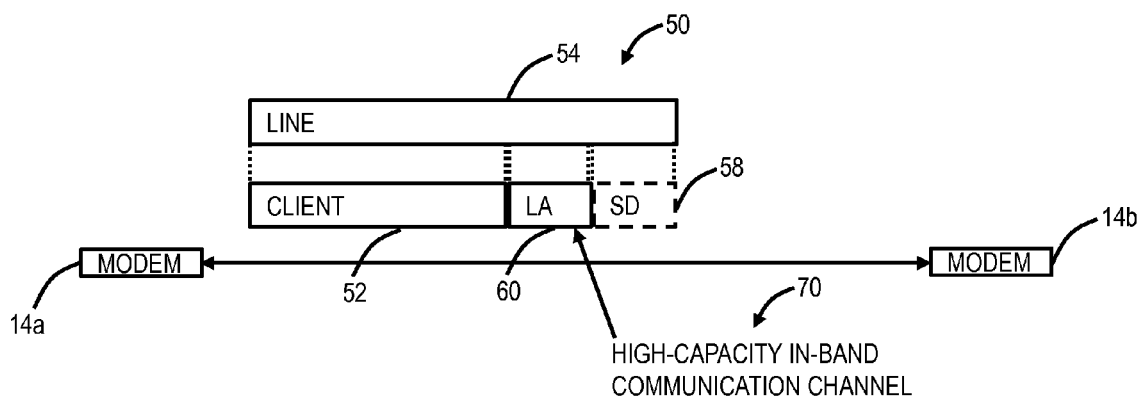
FIG. 3 is a logical diagram of a line adaptation process, which may be implemented in the modems in the network of FIG. 1.

In various exemplary embodiments, the network 10 includes in-band communication channels formed within each of the modems 14 using line rate adaptation bandwidth from a line adaptation process 50 described in FIGS. 2 and 3. Each of the in-band communication channels is formed separately between the associated modems 14. For example the network 10 has two in-band communication channels, namely an in-band communication channel between the node 12a and the node 12c via the modems 14a, 14b and an in-band communication channel between the node 12a and the node 12b via the modems 14c, 14d. Note, the nodes 12a, 12b, 12c can be configured to connect these separate in-band communication channels as well, such that the node 12c could communicate with the node 12b, through the node 12a. As described herein, the in-band communication channel can scale to significantly more capacity than the current in-band communication channels which use fixed and standardized TDM overhead.

Also, the network 10 is illustrated with both the control plane 18 and the SDN controller 20. The network 10 can utilize only one or both of the control plane 18 and the SDN controller 20. Also, the in-band communication channels can be used for any application, and are not limited to the control plane signaling and/or communication with the SDN controller 20.

Line Adaptation

Referring to FIGS. 2 and 3, in an exemplary embodiment, an atomic function diagram and a logical diagram illustrate the line adaptation process 50, which may be implemented in the modems 14a, 14b. As described herein, the line adaptation process 50 is the process of decoupling client signals from line signals transmitted by the modems 14. The line adaptation process 50 is driven by the desire to provide flexible line rates and modulation schemes through the modems 14, advanced SD-FEC, and the like. An exemplary embodiment of the line adaptation process 50 in detail is described in commonly-assigned U.S. patent application Ser. No. 14/467,769, filed Aug. 25, 2014, and entitled "OTN ADAPTATION FOR SUPPORT OF SUBRATE GRANULARITY AND FLEXIBILITY AND FOR DISTRIBUTION ACROSS MULTIPLE MODEM ENGINES," the contents of which are incorporated by reference herein.

The modems 14 may be configured to use any of duobinary, quadrature amplitude modulation (QAM), differential phase shift keying (DPSK), differential quadrature phase shift keying (DQPSK), orthogonal frequency-division multiplexing (OFDM), polarization multiplexing with any of the foregoing, or any other type of coherent optical modulation and detection technique. For example, the modems 14 can support various different baud rates through software-programmable modulation formats. The modems 14 can support programmable modulation, or constellations with both varying phase and/or amplitude. In an exemplary embodiment, the modem 14 can support multiple coherent modulation formats such as, for example, i) dual-channel, dual-polarization (DP) binary phase-shift keying (BPSK) for 100 G at submarine distances, ii) DP quadrature phase-shift keying (QPSK) for 100 G at ultra long haul distances, iii) 16-quadrature amplitude modulation (QAM) for 200 G at metro to regional (600 km) distances), or iv) dual-channel 16QAM for 400 G at metro to regional distances. Thus, in an exemplary embodiment, the same modem 14 can support 100 G to 400 G. With associated digital signal processing (DSP) in the modem 14 hardware, moving from one modulation format to another is completely software-programmable.

In another exemplary embodiment, the modem 14 can support N-QAM modulation formats with and without dual-channel and dual-polarization where N can even be a real number and not necessarily an integer. Here, the modem 14 can support non-standard speeds since N can be a real number as opposed to an integer, i.e. not just 100 G, 200 G, or 400 G, but variable speeds, such as 130 G, 270 G, 560 G, etc. These rates could be integer multiples of 10 Gb/s, or of 1 Gb/s. Furthermore, with the DSP and software programming, the capacity of the flexible optical modem can be adjusted upwards or downwards in a hitless manner. Additionally, the modem 14 can support various aspects of nonlinear effect mitigation and dispersion compensation (both for chromatic and polarization mode) in the electrical domain, thus eliminating external dispersion compensation devices, filters, etc. The modems 14 can also adapt the forward error correction coding that is used, as another method to trade-off service rate vs. noise tolerance. An example of the modem 14 is Ciena's WaveLogic 3 and 4 coherent optics.

In FIG. 2, an atomic function diagram illustrates the line adaptation process 50, which may be implemented in the modems 14. The line adaptation process 50 can be based on client signals, including the ITU-T standard Optical channel Transport Unit k (k=0, 1, 2, 3, 4, flex) or C=100×n (n=1, 2, 3 . . . ) (OTUk/Cn) frame structures and tributary slots; other variants or implementations are also contemplated. Note, the adaptation of client signals such as OTUk/Cn for Single Vendor Intra-Domain Interface (SV-IaDI) is not subject to standardization. That is, the line adaptation process 50 is used for a vendor's line-side transmission. Note, while each vendor may implement the line adaptation process 50 differently, there are common characteristics of all implementations, including the fact that the client signal is decoupled from the line signal and there is line adaptation bandwidth between the two. The line adaptation process 50 is illustrated from the top, and includes a client 52, for adaptation to a line 54. The line adaptation process 50 can take in an OTUk/Cn frame or the like, and format or wrap it appropriately for a proprietary line. After an adaptation 56 of the client 52, SD-FEC 58 can be added, and the line 54 can be provided to the modem 14.

FIG. 3 provides a logical view of the line adaptation process 50 between the modems 14*a*, 14*b*. Of note, the line 54 has a rate greater than the client 52, and a difference between the line 54 and the client can be referred to as Line Adaptation (LA) 60. Conventionally, the LA 60 can include cells, stuffing bytes, etc., which contain idle/null data required for a rate adaptation between the client 52 and the line 54. Specifically, all or some of the bandwidth associated with the LA 60 forms an in-band communication channel 70. There is an interface and mechanism in circuitry in the modem 14 to populate the LA 60 with meaningful communications data (e.g., sourced from an on-board host processor or Ethernet switch), and to extract this data at the far end modem 14 to form the in-band communication channel 70. This provides an efficient "East-West" communications link in-band on the optical line, independent of the client 52, but propagating concurrently with the client 52 in the line 54. In an exemplary embodiment, the nominal bandwidth for the in-band communication channel 70 can scale to significantly higher than the 13 Mb/s channel available with an ODU4 OTN GCC link (i.e., at least an order of magnitude or greater). Note, due to the flexibility of the modems 14 as described herein, the in-band communication channel 70 could run at any rate by offsetting line to client rate.

Method for Providing an in-Band Communication Channel

Figure 4:
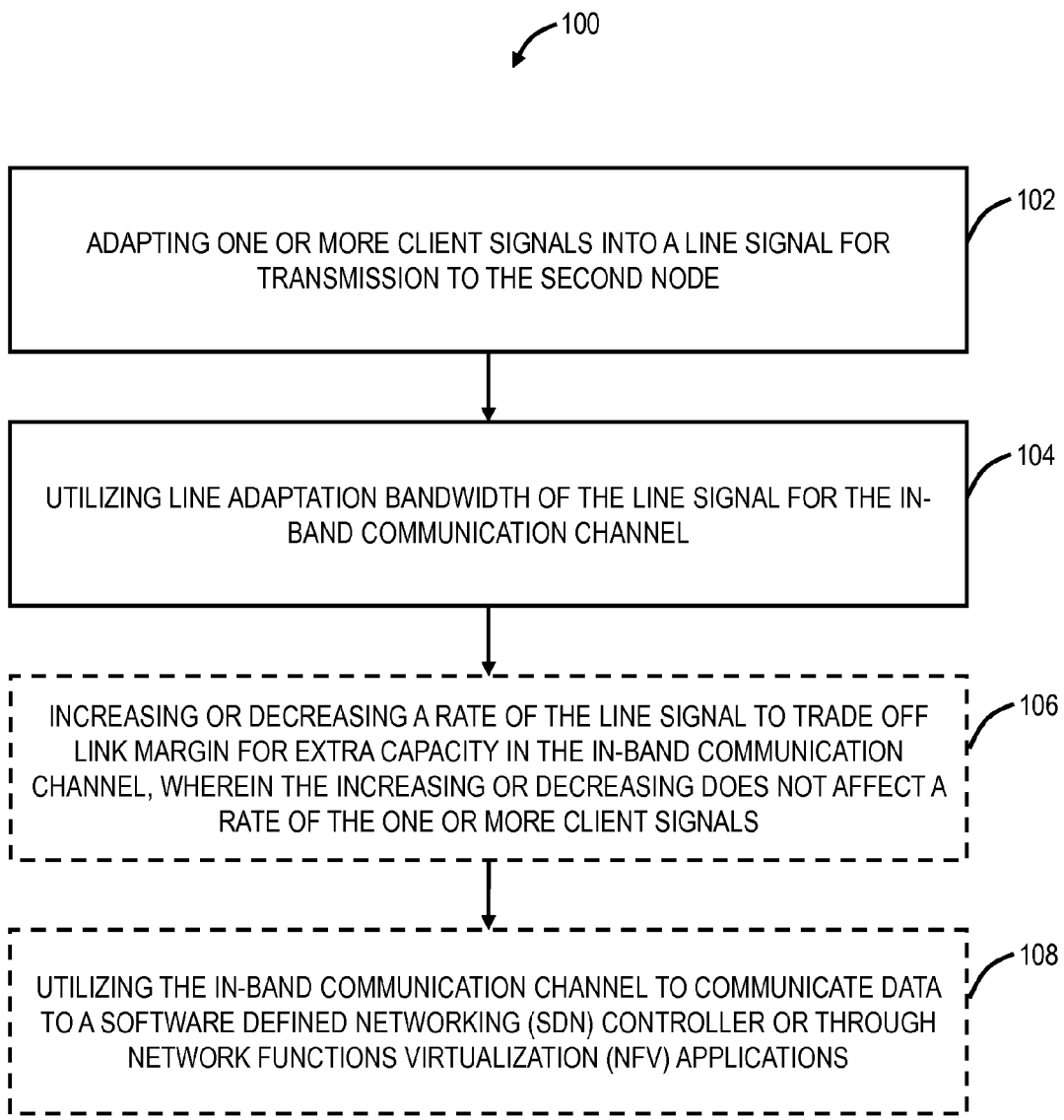
FIG. 4 is a flow chart of a method for providing an in-band communication channel.

Referring to FIG. 4, in an exemplary embodiment, a flow chart illustrates a method 100 for providing an in-band communication channel. Specifically, the method 100 contemplates implementation by a first node 12 to create the in-band communication channel with a second node 12 in an optical network. The method 100 includes adapting one or more client signals into a line signal for transmission to the second node (step 102), and utilizing line adaptation bandwidth of the line signal for the in-band communication channel (step 104).

Optionally, the method 100 can include increasing or decreasing a rate of the line signal to trade off link margin for extra capacity in the in-band communication channel, wherein the increasing or decreasing does not affect a rate of the one or more client signals (step 106). The rate increase can be permanent or temporarily. Note, since the in-band communication channel described herein is independent of the one or more client signals, the increasing does not affect a rate of the one or more client signals. Specifically, the in-band communication channel is operationally independent from the one or more client signals while concurrently being transported together over the line signal. As described herein, the one or more client signals are adapted to decouple them from the line signal for transmission via an optical modem, to support flexible modulation, line rates, advanced FEC schemes, and the like.

Optionally, the method 100 can include utilizing the in-band communication channel to communicate data to a Software Defined Networking (SDN) controller or through Network Functions Virtualization (NFV) applications (step 108). Additionally, the in-band communication channel can be used for any network function, such as and without limitation, OAM & P, control plane signaling, general data communications by a network operator, and the like. The one or more client signals can be any of Optical channel Transport Unit k (k=0, 1, 2, 3, 4, flex) or OTUk/Cn where C=100×n (n=1, 2, 3, . . . ) and the line signal can be a proprietary Single Vendor Intra-Domain Interface (SV-IaDI) signal.

The one or more client signals each include in-band communication channels through Optical Transport Network (OTN) General Communication Channel (GCC) overhead that can be operated concurrently with the in-band communication channel. For example, the in-band communication channels from the one or more client signals can be used for control plane signaling while the in-band communication channel described herein can be used for other purposes such as SDN communication. Also, the in-band communication channel described herein is at least an order of magnitude greater in capacity than each of the in-band communication channels from the one or more client signals.

Exemplary Network Element/Node

Figure 5:
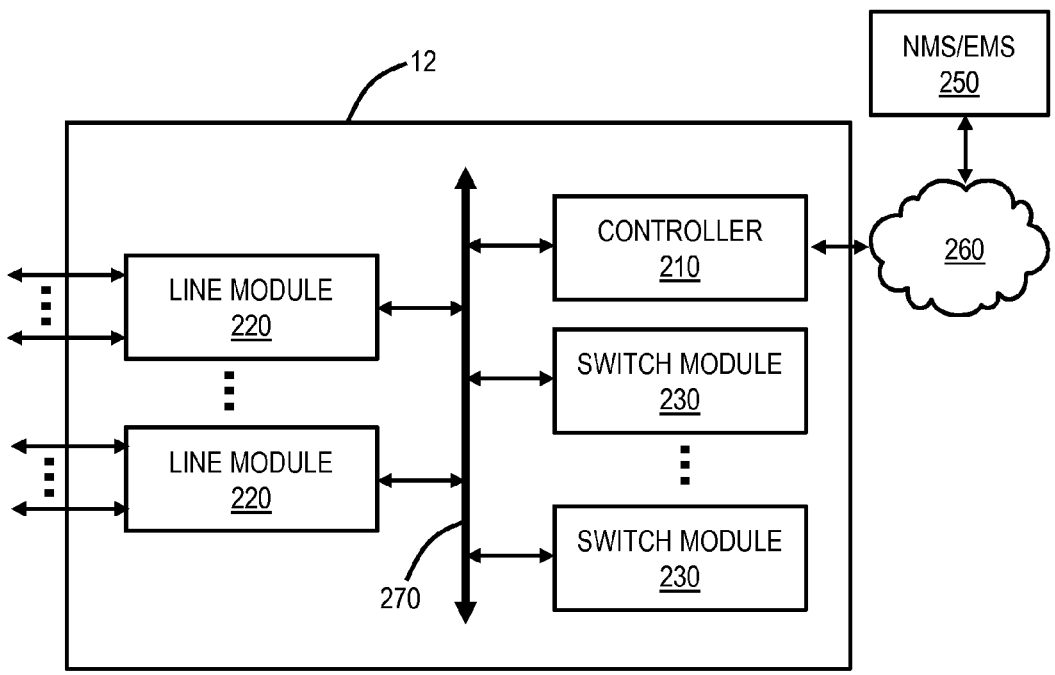
FIG. 5 is a block diagram of an exemplary node for use with the systems and methods described herein.

Referring to FIG. 5, in an exemplary embodiment, a block diagram illustrates an exemplary node 12 for use with the systems and methods described herein. In an exemplary embodiment, the exemplary node 12 can be a network element that may consolidate the functionality of a Packet-Optical Transport System (POTS), Multi-Service Provisioning Platform (MSPP), Digital Cross Connect (DCS), Ethernet and/or Optical Transport Network (OTN) switch, Wave Division Multiplexed (WDM) platform, etc. into a single, high-capacity intelligent switching system providing Layer 0, 1, and/or 2 consolidation. In another exemplary embodiment, the node 12 can be any of an OTN Add/Drop Multiplexer (ADM), Reconfigurable Optical Add/Drop Multiplexer (ROADM), an MSPP, a DCS, a POTS, an optical cross-connect, an optical switch, a router, a switch, a WDM platform, an access/aggregation device, etc. That is, the node 12 can be any digital system with ingress and egress digital signals and switching of channels, timeslots, tributary units, etc. and/or photonic system with ingress and egress wavelengths and switching. While the node 12 is generally shown as an optical network element, the systems and methods contemplated for use with any switching fabric, network element, or network based thereon. In the context of the in-band communication channel described herein, the node 12 is any node with the modems 14 performing the line adaptation process 50 where the LA 60 can be utilized as the in-band communication channel 70.

In an exemplary embodiment, the node 12 includes a controller 210, one or more line modules 220, and one or more switch modules 230. The controller 210 can include operations, administration, maintenance, and provisioning (OAM & P) access; user interface ports; and the like. The controller 210 can also include circuitry to connect various in-band communication channels 70 terminating at the node 12 together for communication between them. For example, the controller 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the controller 210 can be configured to operate the control plane as described herein. The node 12 can include an interface 270 for communicatively coupling the controller 210, the line modules 220, and the switch modules 230 together. For example, the interface 270 can be a backplane, mid-plane, a bus, optical or electrical connectors, or the like.

The line modules 220 are configured to provide ingress and egress to the switch modules 230 and to external connections on links to/from the node 12. The line modules 220 can include one or more of the modems 14 described herein. That is, the line modules 220 can include the modems 14 that form the links 16 in the network 10. The line modules 220 can include one or more modems 14 as well as interface hardware to the modems 14 and circuitry connecting the modems 14 to the interface 270 and other components in the node 12. Also, the line modules 220, in addition to the modems 14 which can be viewed as Network-Network Interface (NNI) ports, can include client or short reach interfaces for User-Network Interface (UNI) ports. From a logical perspective, the line modules 220 provide ingress and egress ports to the node 12, and each line module 220 can include one or more physical ports. The switch modules 230 are configured to switch channels, wavelengths, timeslots, tributary units, packets, etc. between the line modules 220.

Those of ordinary skill in the art will recognize the node 12 can include other components which are omitted for illustration purposes, and that the systems and methods described herein is contemplated for use with a plurality of different network elements with the node 12 presented as an exemplary type of a network element. For example, in another exemplary embodiment, the node 12 may not include the switch modules 230, but rather have the corresponding functionality in the line modules 220 (or some equivalent) in a distributed fashion. For the node 12, other architectures providing ingress, egress, and switching between are also contemplated for the systems and methods described herein. In general, the systems and methods described herein contemplate use with any network element providing switching of channels, timeslots, tributary units, wavelengths, etc. and using the control plane 18, the SDN controller 20. Furthermore, the node 12 is merely presented as one exemplary node 12 for the systems and methods described herein.

With respect to the in-band communication channels, the modems 14 on the line modules 220 can form a respective in-band communication channel with their associated peer modem in another node 12. The controller 210 can be configured to bridge, switch, etc. all of the communications from all of the in-band communication channels at the node 12 such that there is connectivity through the node 12. The line modules 220 can each include one or more modems 14 with circuitry configured to adapt one or more client signals to transmit to the second node over a line signal, and circuitry configured to utilize line adaptation bandwidth based on the adapted one or more client signals and the line signal for the in-band communication channel.

Exemplary Controller

Figure 6:
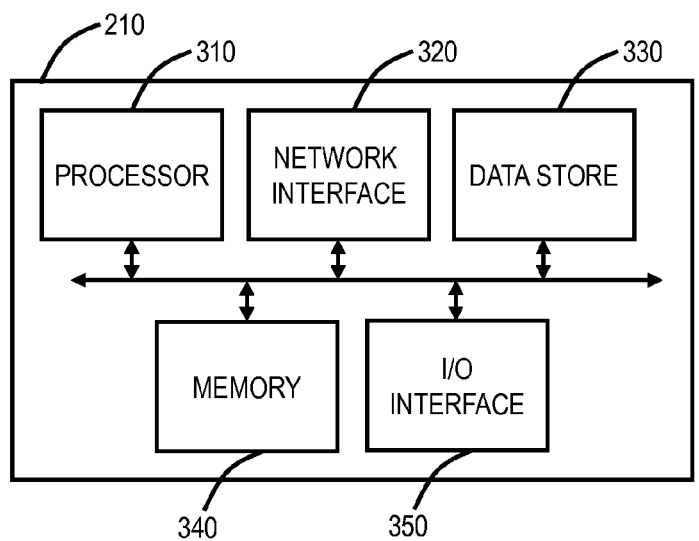
FIG. 6 is a block diagram of a controller from the node of FIG. 5, to provide control plane processing, SDN communication, OAM & P, and data connectivity between in-band communication channels.

Referring to FIG. 6, in an exemplary embodiment, a block diagram illustrates a controller 210 from the node 12, to provide control plane processing, SDN communication, OAM & P, and data connectivity between the in-band communication channels at the node 12. The controller 210 can include a processor 310 which is hardware device for executing software instructions, such as operating the control plane 18, communicating with the SDN controller 20, etc. The processor 310 can be any custom made or commercially available processor, a central processing unit (CPU), an auxiliary processor among several processors associated with the controller 210, a semiconductor-based microprocessor (in the form of a microchip or chip set), or generally any device for executing software instructions. When the controller 210 is in operation, the processor 310 is configured to execute software stored within memory, to communicate data to and from the memory, and to generally control operations of the controller 210 pursuant to the software instructions. The controller 210 can also include a network interface 320, a data store 330, memory 340, an Input/output (I/O) interface 350, and the like, all of which are communicatively coupled therebetween and with the processor 310.

The network interface 320 can be used to enable the controller 210 to communicate on the DCN 260, such as to communicate control plane information to other controllers, to the management system 250, and the like. The network interface 320 can also include circuitry to tie various in-band communication channels at the node 12 together. The data store 330 can be used to store data, such as control plane information, provisioning data, OAM & P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 210 to communicate to other devices. Further, the I/O interface 350 includes components for the controller 210 to communicate with the other nodes, such as using overhead associated with OTN signals.

In an exemplary embodiment, the controller 210 is configured to communicate with other controllers 210 in the network 10 to operate the control plane 18 with control plane signaling. In another exemplary embodiment, the controller 210 is configured to communicate with the SDN controller 20. In a further exemplary embodiment, the controller 210 can be configured to operate the control plane 18 and communicate with the SDN controller 20. From a Data Communication Network (DCN) perspective, the in-band communication channels can provide transport between the nodes 12, while the controller 210 can provide the switching and processing. In addition to working with the in-band communication channels, the controller 210 also contemplates operation with out-of-band communications, e.g., an overlaid Internet Protocol (IP) network such as, for example, User Datagram Protocol (UDP) over IP, and conventional in-band communications, i.e., SONET/SDH DCC or OTN GCC.

Line Adaptation Example

As described above, an exemplary embodiment of the line adaptation process 50 in detail is described in commonly-assigned U.S. patent application Ser. No. 14/467,769, filed Aug. 25, 2014, and entitled "OTN ADAPTATION FOR SUPPORT OF SUBRATE GRANULARITY AND FLEXIBILITY AND FOR DISTRIBUTION ACROSS MULTIPLE MODEM ENGINES," the contents of which are incorporated by reference herein. In an exemplary embodiment of line adaptation, an OTUCn line adaptation layer for a proprietary line side (SV-IaDI) splits or segments the OTUCn into 10 G tributary slots (i.e., 10× per OTUC1), and only transmits on the line side the allocated tributary slots and OTUCn overhead. The process removes extra unused capacity of a standard OTUCn 100 G container. This adapts a standard OTUCn frame (or any High Order (HO) or Super HO (SHO) OTN signal), but utilizes the tributary slot structure within an OPUCn payload to get to 10 G granularity. LO ODUk (k=0, 1, 2, 3, 4, flex) can get mapped into OTUCn tributary slots with 10 G granularity and these will be adapted on the line. On the receive side of the line, an m×10 G signal is reconstituted and put back into an OTUCn standard frame format. Ethernet clients can be sub-rate groomed, then mapped to an appropriately sized ODUflex, and then mapped to m×10 G tributary slots in the OTUCn structure. At the receive side of the line, the ODUflex signal is recovered from the equivalent set of allocated tributary slots.

In another exemplary embodiment, an OTUCn cell adaptation layer for a proprietary line side (SV-IaDI) creates fixed-sized cells from multiple traffic streams. These cells are switched using scheduling algorithms across a cell switch which is distributed outside or inside multiple DSP/modem devices or engines. The switch distributes cells to the multiple DSP/modem devices or engines, which achieves flexible bandwidth split. Cells having taken different paths are deskewed and aligned on the receiver to recreate the original signal. The cells contain unique IDs for switching and path selection within the modem/DSP device scope (and the line adaptation). This provides a process for addressing the complexities of providing flexible bandwidth across multiple modem/DSP devices.

Advantageously, theses OTN line adaptation systems and methods align to the ITU-T OTUCn structure and models, but extend the protocol (OTN frame format) to achieve flexible rates at small increments below 100 G. This allows adaptation of a fixed rate interface to a flexible rate line interface. ITU standards are not planning on defining SV-IaDI adaptation for OTUCn. Note, SV-IaDI is an adaptation between standard client interfaces at OTUCn and optical modems. This allows flex line and bandwidth splits among multiple devices/wavelengths. Additionally, the OTN line adaptation systems and methods result in a small logic implementation in comparison to other muxing schemes. Also, the mapping into cells can be protocol agnostic, and does not have to be limited to 10 G granularity. This approach provides flexibility of cells (or packets) to switch and assign different path to the desired Time Division Multiplexing (TDM) (OTUCn) traffic. Again, unused bandwidth after the line adaptation is used herein for the in-band communication channel.

These OTN line adaptation systems and methods use OTUCn as SHO (or HO OTUk) to avoid proprietary schemes and align with future 100 G OTN standardization. The OTN line adaptation systems and methods prevent unnecessary mapping/demapping stages by carrying OTUCn OH+payload into cells and only sending used (allocated) tributary slots in 10 G increments (or any other increments). The OTN line adaptation systems and methods carry tributary slots independently whether the traffic source includes a single Cn, groups of Cn (e.g., C5) in single chip or groups of Cn across multi-chips. In this manner, the OTN line adaptation systems and methods disassociate modem rate to OTUC1 and tributary slot structure.

Figure 7:
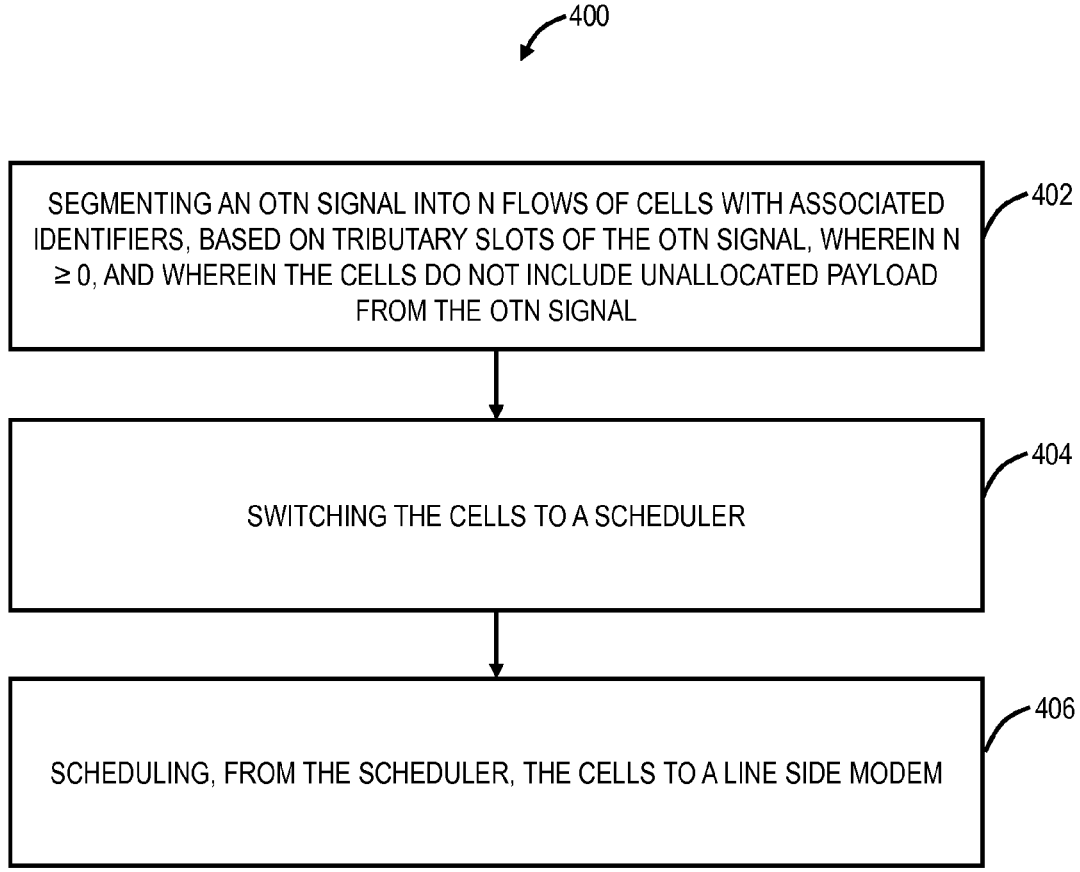
FIG. 7 is a flow chart illustrates a process for Optical Transport Network (OTN) line adaptation to provide sub-rate granularity and distribution.

Referring to FIG. 7, in an exemplary embodiment, a flow chart illustrates a process 400 for Optical Transport Network (OTN) line adaptation to provide sub-rate granularity and distribution. The process 400 includes segmenting an OTN signal into N flows of cells with associated identifiers, based on tributary slots of the OTN signal, wherein N≥0, and wherein the cells do not include unallocated payload from the OTN signal (step 402). The process 400 also includes switching the cells to a scheduler (step 404). Finally, the process 400 includes scheduling, from the scheduler, the cells for a line side modem (step 406). Note, the steps 404, 406 can include switching the cells, with a scheduler, to one or more line side modems. The OTN signal can be one of a) from a client and the N flows of cells from the client are sent to different line side modems and b) from two or more clients and the N flows of cells from the two or more clients are sent to a same line side modem.

The segmenting can be determined based on the OPU Multiframe Identifier (OMFI) and Multiplex Structure Identifier (MSI) associated with the OTN signal, and N is based on a number of allocated tributary slots in the OTN signal. When N=0, only overhead is provided in the cells to the line side modem. The OTN signal is an Optical channel Transport Unit (C=100)×n (n=1, 2, 3, . . . ) (OTUCn) or a High Order or Super High Order OTN signal with tributary slots. The signal provided to the line side modem is a sub-rate of the OTUCn or the High Order or Super High Order OTN signal with tributary slots or a full-rate of the same signal. The scheduling can utilize round robin or a calendar. The method can further include inserting a framing cell to enable recovery from the line side modem. The scheduling can include scheduling some of the cells to a second line side modem.

In the various exemplary embodiments described herein, reference has been made to OTUCn for illustration purposes. Those of ordinary skill in the art will recognize the systems and methods can also be used on High Order (HO) OTN signals with corresponding tributary slots. For example, an HO OTU4 has 80 TSs of 1.25 G each, and the systems and methods described herein can enable transmission of less than the 80 TSs, i.e. a sub-rate, to provide a composite signal of less than 100 G to the line side modem when there are unallocated TSs. The systems and methods also contemplate operations with any Super High Order (SHO) OTN signal that may be developed. For example, OTUCn has been described herein where C=100 and n=1, 2, 3 . . . , and there may be other variants of this such as OTULn where L=50 and n=1, 2, 3, . . . for increments of 50 G (whereas the OTUCn has increments of 100 G). Any such embodiments are contemplated herein. Again, the line adaptation bandwidth left over from the process 400 can be used as described herein for the in-band communication channel.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, in a first node in an optical network, for providing an in-band communication channel to a second node in the optical network, the method comprising:
    adapting one or more client signals into a line signal by circuitry in an optical modem for transmission to the second node via mapping of the one or more client signals into the line signal;
    providing the in-band communication channel based on line adaptation bandwidth of the line signal, wherein the line adaptation bandwidth is bandwidth due to the mapping, and wherein the in-band communication channel in the line adaptation bandwidth is operationally independent from the one or more client signals while concurrently being transported together over the line signal; and
    transmitting the line signal via circuitry in the optical modem.

2. The method of claim 1, further comprising:
    increasing or decreasing a rate of the line signal to trade off link margin based on a required capacity in the in-band communication channel, wherein the increasing or decreasing does not affect a rate of the one or more client signals.

3. The method of claim 1, wherein the in-band communication channel is operationally independent from the one or more client signals while concurrently being transported together over the line signal.

4. The method of claim 1, wherein the adapting allows a rate of the line signal to be independent of rates of the one or more client signals.

5. The method of claim 1, further comprising:
    utilizing the in-band communication channel to communicate data to a Software Defined Networking (SDN) controller or through Network Functions Virtualization (NFV) applications.

6. The method of claim 1, wherein the one or more client signals are any of Optical channel Transport Unit k (k=0, 1, 2, 3, 4, flex) or OTUk/Cn where C=100×n (n=1, 2, 3, . . . ) and the line signal is a proprietary Single Vendor Intra-Domain Interface (SV-IaDI) signal.

7. The method of claim 1, wherein the one or more client signals each include in-band communication channels through Optical Transport Network (OTN) General Communication Channel (GCC) overhead that is operated concurrently with the in-band communication channel.

8. The method of claim 7, wherein the in-band communication channels from the one or more client signals are used for control plane signaling.

9. The method of claim 7, wherein the in-band communication channel is at least an order of magnitude greater in capacity than each of the in-band communication channels of the one or more client signals.

10. An optical modem configured to provide an in-band communication channel, the optical modem comprising:
    circuitry in the optical modem configured to
    adapt one or more client signals into a line signal for transmission to another modem via mapping the one or more client signals into the line signal;
    provide the in-band communication channel based on line adaptation bandwidth of the line signal, wherein the line adaptation bandwidth is bandwidth due to mapping the one or more client signals into the line signal, and wherein the in-band communication channel in the line adaptation bandwidth is operationally independent from the one or more client signals while concurrently being transported together over the line signal; and
    transmit the line signal.

11. The optical modem of claim 10, wherein the optical modem is configured to one of increase a rate of the line signal to trade off link margin based on required capacity in the in-band communication channel or decrease the rate when the in-band communication channel requires less capacity, wherein the increased rate of the line signal does not affect a rate of the one or more client signals.

12. The optical modem of claim 10, wherein the in-band communication channel is operationally independent from the one or more client signals while concurrently being transported together over the line signal.

13. The optical modem of claim 10, wherein the one or more client signals are adapted to the line signal allowing a rate of the line signal to be independent of rates of the one or more client signals.

14. The optical modem of claim 10, wherein the optical modem is configured to utilize the in-band communication channel to communicate data to a Software Defined Networking (SDN) controller.

15. The optical modem of claim 10, wherein the one or more client signals are any of Optical channel Transport Unit k (k=0, 1, 2, 3, 4, flex) or OTUk/Cn where C=100×n (n=1, 2, 3, . . . ) and the line signal is a proprietary Single Vendor Intra-Domain Interface (SV-IaDI) signal.

16. The optical modem of claim 10, wherein the one or more client signals each include in-band communication channels through Optical Transport Network (OTN) General Communication Channel (GCC) overhead that is operated concurrently with the in-band communication channel.

17. The optical modem of claim 16, wherein the in-band communication channels from the one or more client signals are used for control plane signaling.

18. The optical modem of claim 16, wherein the in-band communication channel is at least an order of magnitude greater in capacity than each of the in-band communication channels of the one or more client signals.

19. A node configured to provide an in-band communication channel in an optical network, the node comprising:
one or more optical modems each comprising circuitry configured to
adapt one or more client signals into a line signal by the circuitry for transmission to another modem via mapping of the one or more client signals into the line signal,
provide the in-band communication channel based on line adaptation bandwidth of the line signal, wherein the line adaptation bandwidth is bandwidth due to the mapping, and wherein the in-band communication channel in the line adaptation bandwidth is operationally independent from the one or more client signals while concurrently being transported together over the line signal, and
transmit the line signal to another optical modem; and
a controller communicatively coupled to the one or more optical modems, wherein the controller is configured to enable communications between the in-band communication channel.

20. The node of claim 19, wherein the controller is configured to communicate with a Software Defined Networking (SDN) controller through the in-band communication channels.

* * * * *